United States Patent [19]
Gray

[11] Patent Number: 5,899,534
[45] Date of Patent: May 4, 1999

[54] CHILD SEAT FOR A VEHICLE AND A SEAT BELT SYSTEM FOR THE CHILD SEAT

[75] Inventor: Mark F. Gray, Attica, Mich.

[73] Assignee: TRW Vehicle Safety Systems Inc., Lyndhurst, Ohio

[21] Appl. No.: 08/262,461

[22] Filed: Jun. 20, 1994

[51] Int. Cl.[6] .................................................. A47C 31/00
[52] U.S. Cl. ...................... 297/484; 297/238; 297/467; 297/475
[58] Field of Search ................................ 297/250.1, 234, 297/238, 464, 467, 468, 484, 473–480

[56] References Cited

U.S. PATENT DOCUMENTS

| | | |
|---|---|---|
| 2,825,581 | 3/1958 | Knight . |
| 3,620,569 | 11/1971 | Mathis .................................... 297/478 |
| 3,910,634 | 10/1975 | Morris . |
| 4,033,622 | 7/1977 | Boudreau . |
| 4,342,483 | 8/1982 | Takada . |
| 4,688,849 | 8/1987 | Tsuge et al. . |
| 4,768,828 | 9/1988 | Kohketsu . |
| 4,858,997 | 8/1989 | Shubin . |
| 4,882,213 | 11/1989 | Gaddis et al. . |
| 4,979,777 | 12/1990 | Takada . |
| 4,986,600 | 1/1991 | Leblanc et al. . |
| 5,022,669 | 6/1991 | Johnson . |
| 5,061,012 | 10/1991 | Parker et al. . |
| 5,082,325 | 1/1992 | Sedlack . |
| 5,123,673 | 6/1992 | Tame . |
| 5,135,285 | 8/1992 | Dukatz et al. . |
| 5,161,855 | 11/1992 | Harmon .................................. 297/238 |
| 5,286,084 | 2/1994 | Bart ......................................... 297/238 |
| 5,332,284 | 7/1994 | Elton et al. ............................. 297/238 |
| 5,364,169 | 11/1994 | Collins et al. ....................... 297/238 X |

FOREIGN PATENT DOCUMENTS 1277682  9/1968  Germany .

*Primary Examiner*—Milton Nelson, Jr.
*Attorney, Agent, or Firm*—Tarolli, Sundheim, Covell, Tummino & Szabo

[57] ABSTRACT

A child seat (10) for a vehicle has a seat belt system (12) for restraining a seated child. The seat belt system (12) includes seat belt webbing (16), a pair of webbing anchors (150, 160), and a retractor assembly (18). The webbing (16) has a plurality of sections including first and second shoulder belt sections (64, 74), each which has an upper end and a lower end. The webbing anchors (150, 160) permanently attach the upper ends (154, 164) of the shoulder belt sections (64, 74) to the seat back (24). The retractor assembly (18) takes up slack in the webbing (16) by pulling the lower ends (170, 172) of the shoulder belt sections (64, 74) toward the seat cushion (22).

7 Claims, 4 Drawing Sheets

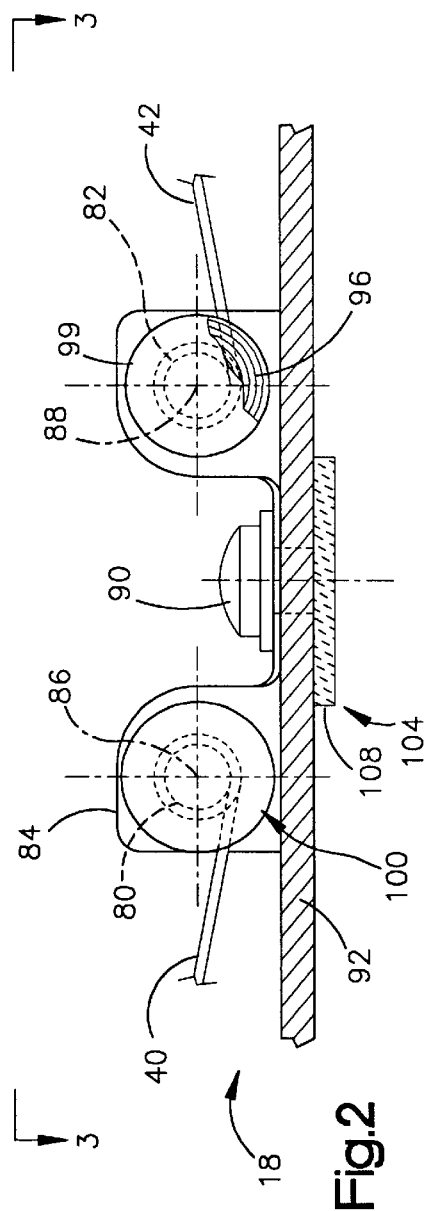
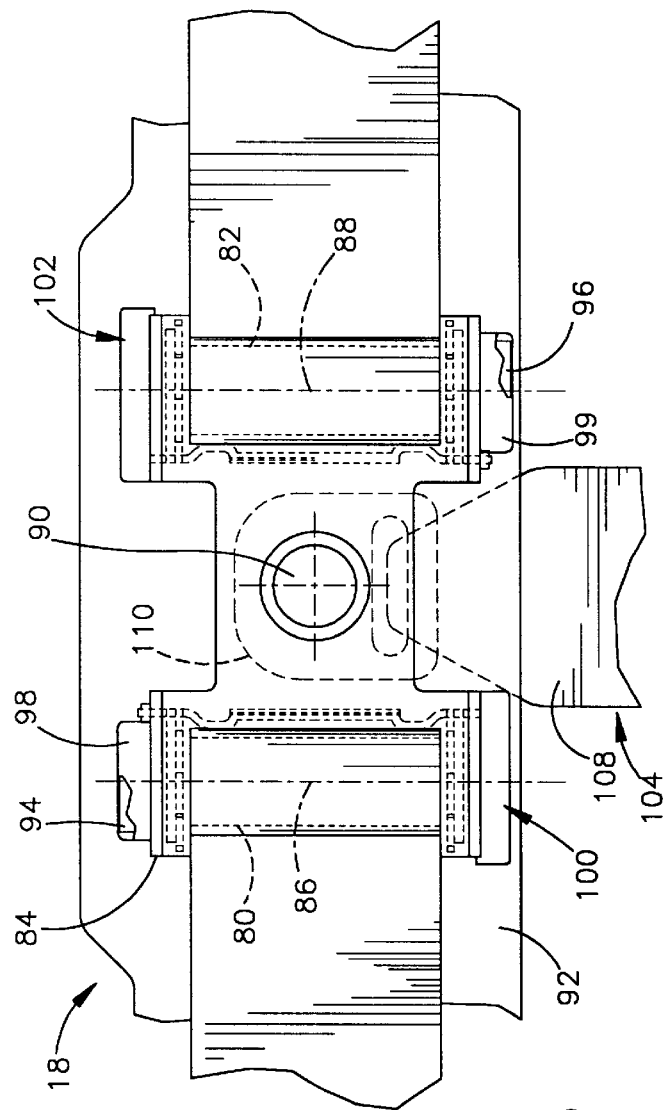

5,899,534

1

CHILD SEAT FOR A VEHICLE AND A SEAT BELT SYSTEM FOR THE CHILD SEAT

FIELD OF THE INVENTION

The present invention relates to a seat belt system for restraining an occupant of a vehicle seat, and particularly relates to a child seat and a child seat belt system for restraining a seated child.

BACKGROUND OF THE INVENTION

A child seat for a vehicle generally has a child seat belt system for restraining a seated child. The child seat belt system includes a pair of shoulder belts which extend downward from the seat back toward the seat cushion. The shoulder belts typically are connected to a common tongue which is releasably lockable in a buckle at the front of the seat cushion.

In one type of child seat belt system, the shoulder belts have free ends at the seat back, and are adjusted to desired lengths by sliding their free ends through clasp-type buckles on the seat back. Such a child seat belt system is disclosed, for example, in U.S. Pat. No. 4,033,622. In a similar type of child seat belt system, the shoulder belts are adjusted in length by detaching and reattaching their free ends to the seat back. An example of that type of system is disclosed in U.S. Pat. No. 5,082,325. A child seat belt system having a combination of the foregoing types of adjustment features is disclosed in U.S. Pat. No. 4,986,600.

In another type of child seat belt system, the ends of the two shoulder belts are connected to a third belt. The third belt extends downward behind the seat back, and further extends forward beneath the seat cushion to a seat belt retractor which is mounted on the seat cushion. The retractor continuously applies a retracting force to the third belt, and thus pulls the third belt downward behind the seat back. The ends of the two shoulder belts are pulled downward behind the seat back with the third belt. As a result, the portions of the shoulder belts that extend from the seat back toward the seat cushion are pulled upward toward the seat cushion. Slack in the shoulder belts is thus taken up continuously by the retractor. An example of this type of child seat belt system is disclosed in U.S. Pat. No. 5,061,012.

SUMMARY OF THE INVENTION

In accordance with the present invention, a child seat for a vehicle includes a seat back and a seat cushion. A child seat belt system for the child seat includes seat belt webbing having a plurality of sections, including first and second shoulder belt sections. Each of the shoulder belt sections has an upper end and a lower end. The child seat belt system further comprises means for permanently attaching the upper ends of the shoulder belt sections to the seat back, and means for taking up slack in the webbing by pulling the lower ends of the shoulder belt sections downward toward the seat cushion.

In a preferred embodiment of the present invention, the seat belt webbing further includes first and second lap belt sections which are contiguous with the first and second shoulder belt sections, respectively. The means for taking up slack in the webbing includes a retractor assembly with spring means for retracting the lap belt sections inward of the seat cushion. Slack in the shoulder belt sections is taken up as retraction of the lap belt sections pulls the shoulder belt sections downward toward the seat cushion.

In another preferred embodiment of the present invention, the webbing includes a crotch belt extending from the seat

2 cushion. A retractor assembly in the second embodiment of the invention has a spring means for retracting the crotch belt inward of the seat cushion. A seat belt buckle is fixed to the crotch belt, and a pair of tongues are releasably lockable in the buckle. Each of the lower ends of the shoulder belt sections is connected to a respective one of the tongues. Slack is taken up in the crotch belt as the crotch belt is retracted inward of the seat cushion by the retractor assembly. Slack is taken up in the shoulder belt sections as retraction of the crotch belt pulls the buckle, the tongues, and the lower ends of the shoulder belt sections downward toward the seat cushion.

BRIEF DESCRIPTION OF THE DRAWINGS

Further features of the present invention will become apparent to those skilled in the art to which the present invention relates from reading the following description with reference to the accompanying drawings, in which:

FIG. 2 is a view of a part of the apparatus of FIG. 1 which shown schematically in FIG. 1;

FIG. 3 is a view taken on line 3—3 of FIG. 2;

DESCRIPTION OF PREFERRED EMBODIMENTS

Figure 1:
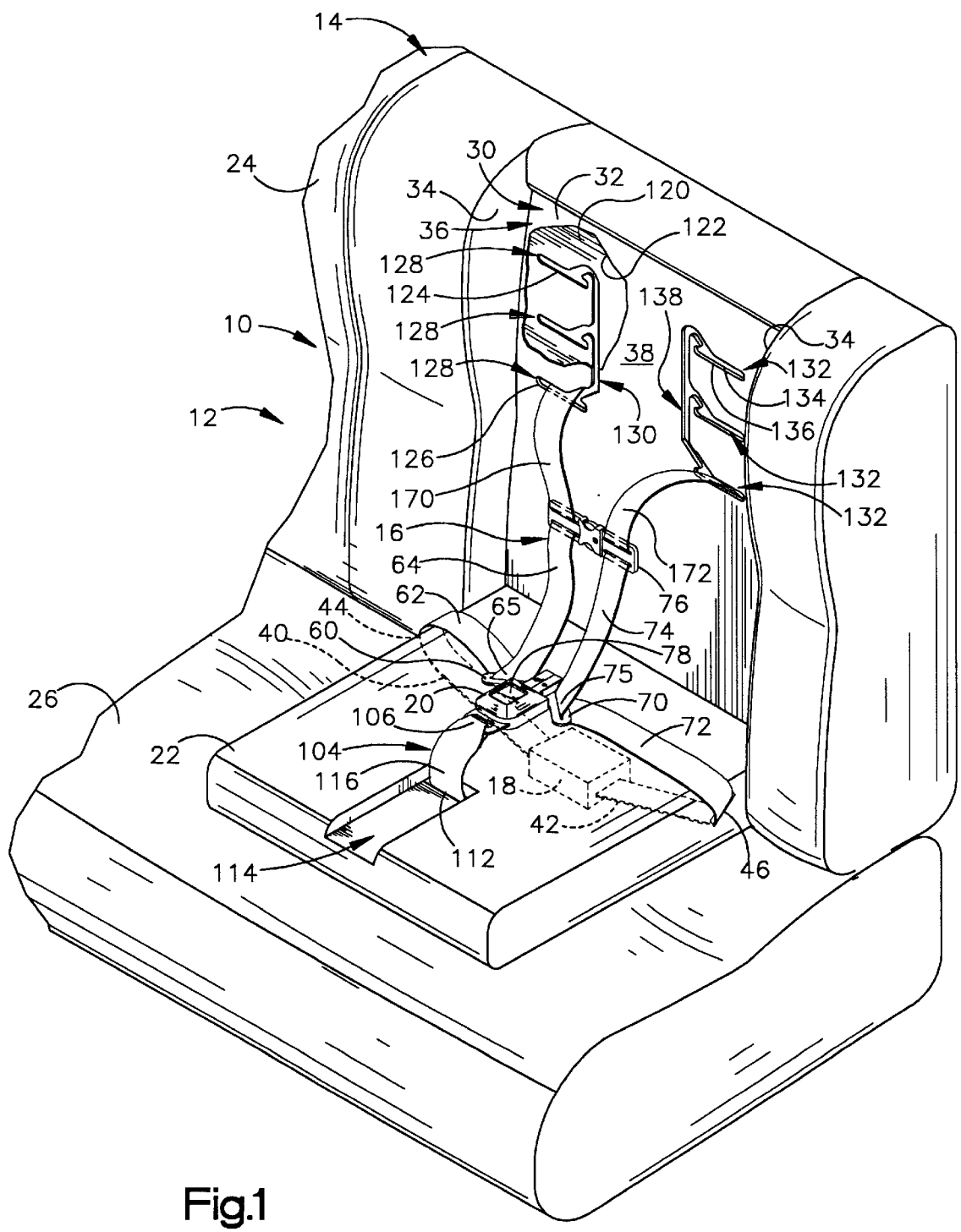
FIG. 1 is a view of an apparatus comprising a first preferred embodiment of the present invention, including a vehicle seat, a child seat and a child seat belt system.

As shown in FIG. 1, a first preferred embodiment of the present invention comprises a child seat 10 and a child seat belt system 12. The child seat 10 is a portion of a vehicle seat 14. The child seat belt system 12 includes seat belt webbing 16, a seat belt retractor assembly 18, and a seat belt buckle 20.

The child seat 10 includes a child seat cushion 22. The child seat cushion 22 pivots downward from the back 24 of the vehicle seat 14 to a lowered position in which it rests on the cushion 26 of the vehicle seat 14, as shown in FIG. 1. The back 24 of the vehicle seat 14 has a recessed surface 30. A back portion 32 of the recessed surface 30 is generally planar and faces forward. A pair of opposite side portions 34 of the recessed surface 30 also are generally planar, and face each other across the back portion 32. The recessed surface 30 is thus shaped to define the back 36 of the child seat 10 when the child seat cushion 22 is in the lowered position of FIG. 1, and to define a compartment 38 in which the child seat cushion 22 is received when it is pivoted upward from the lowered position of FIG. 1.

As shown schematically in FIG. 1, the retractor assembly 18 is mounted in the child seat cushion 22 near the rear, pivoted end of the cushion 22. The seat belt webbing 16 includes first and second belts 40 and 42 which extend from the retractor assembly 18. The first belt 40 extends laterally across the child seat cushion 22 from the retractor assembly 18 to a first webbing outlet opening 44 at one side of the cushion 22. The first belt 40 further extends outward through the first webbing outlet opening 44 and upward to the back 24 of the vehicle seat 14. The second belt 42 extends laterally across the child seat cushion 22 in an opposite direction from the retractor assembly 18 to a second webbing outlet opening 46 at the other side of the cushion 22, outward through the second webbing outlet opening 46, and upward to the back 24 of the vehicle seat 14.

A first tongue 60 is connected with the first belt 40. The first tongue 60 is slidable along the length of the first belt 40, and is releasably lockable in the buckle 20. A lap belt section 62 of the first belt 40 is defined below the first tongue 60, and a contiguous shoulder belt section 64 is defined above the first tongue 60. The shoulder belt section 64 of the first belt 40 thus has a lower end 65 which is defined by the location of the first tongue 60.

A second tongue 70 also is releasably lockable in the buckle 20, and is connected with the second belt 42 so as to be slidable along the length of the second belt 42. Contiguous lap and shoulder belt sections 72 and 74 of the second belt 42 are defined below and above the second tongue 70, respectively. The shoulder belt section 74 of the second belt 42 thus has a lower end 75 which is defined by the location of the second tongue 70.

An adjustment member 76 is connected with the shoulder belt sections 64 and 74 of the first and second belts 40 and 42. The adjustment member 76 adjusts and locates the shoulder belt sections 64 and 74 relative to a seated child in a known manner. Both of the tongues 60 and 70 are unlocked and released from the buckle 20 upon manual depression of a release button 78 on the buckle 20.

The retractor assembly 18 is shown in somewhat greater detail in FIGS. 2 and 3. As shown in FIGS. 2 and 3, the retractor assembly 18 includes a first spool 80 for the first belt 40, and also includes a second spool 82 for the second belt 42. The first and second spools 80 and 82 are supported on a retractor frame 84 for rotation about first and second axes 86 and 88, respectively. A fastener 90 secures the retractor frame 84 to a frame portion 92 of the child seat cushion 22.

The first and second belts 40 and 42 are connected with the first and second spools 80 and 82, respectively. The first belt 40 is wound onto the first spool 80 upon counterclockwise rotation of the first spool 80, and is unwound from the first spool 80 upon clockwise rotation of the first spool 80, with those directions being taken as viewed in FIG. 2. In an opposite manner, the second belt 42 is wound onto the second spool 82 upon clockwise rotation of the second spool 82, and is unwound from the second spool 82 upon counterclockwise rotation of the second spool 82, as viewed in FIG. 2. The first and second spools 80 and 82 are biased to rotate in their winding directions by first and second rewind springs 94 and 96, respectively. The rewind springs 94 and 96 are constructed as known in the art, and each is contained in a respective cylindrical spring cover 98 or 99 which is mounted on the retractor frame 84 in a position generally coaxial with the respective spool 80 or 82.

The retractor assembly 18 further includes first and second lock-up mechanisms 100 and 102. The first and second lock-up mechanisms 100 and 102 are associated with the first and second spools 80 and 82, respectively, and each operates to block unwinding rotation of the respective spool 80 or 82 during a vehicle collision. Such lock-up mechanisms are known in the art. For example, one type of lock-up mechanism operates to block unwinding rotation of a spool in response to a predetermined amount of vehicle deceleration which indicates the occurrence of a vehicle collision. Another type of lock-up mechanism operates to block unwinding rotation of a spool in response to a predetermined amount of accelerating rotation of the spool in its unwinding direction. The predetermined amount of accelerating rotation of the spool is an amount which is predetermined to occur when a vehicle occupant moves suddenly against the webbing as a result of a vehicle collision. A different type of lock-up mechanism blocks unwinding rotation of a spool throughout the time that the webbing is fastened in place about a vehicle occupant, and is known as a cinch mechanism. The lock-up mechanisms 100 and 102 may comprise any of the foregoing types of lock-up mechanisms known in the art. The retractor assembly 18 could alternatively include a cinch mechanism constructed in accordance with the invention set forth in co-pending U.S. patent application Ser. No. 08/288,518, filed May 24, 1995, entitled "Seat Belt Retractor," and assigned to TRW Vehicle Safety Systems Inc. That cinch mechanism operates to cinch two seat belts by blocking unwinding rotation of two spools like the spools 80 and 82.

As shown in FIG. 1, the seat belt webbing 16 further includes a third belt 104. The third belt 104 also extends outward from the child seat cushion 22, and an outer end portion 106 of the third belt 104 is permanently connected to the buckle 20. As shown in FIG. 3, an inner end portion 108 of the third belt 104 is permanently connected to a webbing anchor 110. The webbing anchor 110 is permanently connected by the fastener 90 to the frame portion 92 of the child seat cushion 22 on a surface of the frame portion 92 opposite the retractor assembly 18. The third belt 104 thus anchors the buckle 20 to the child seat cushion 22. Moreover, the third belt 104 extends outward from a third webbing outlet opening 112 at the rear end of a channel-shaped recess 114 which extends from the forward end of the cushion 22 toward the rear end of the cushion 22. An outer portion 116 of the third belt 104 is located outward of the third webbing outlet opening 112. The outer portion 116 is receivable in the recess 114 in varying amounts, depending upon the size of a seated child, and thus defines a crotch belt which can accommodate children of varying sizes.

Figure 4:
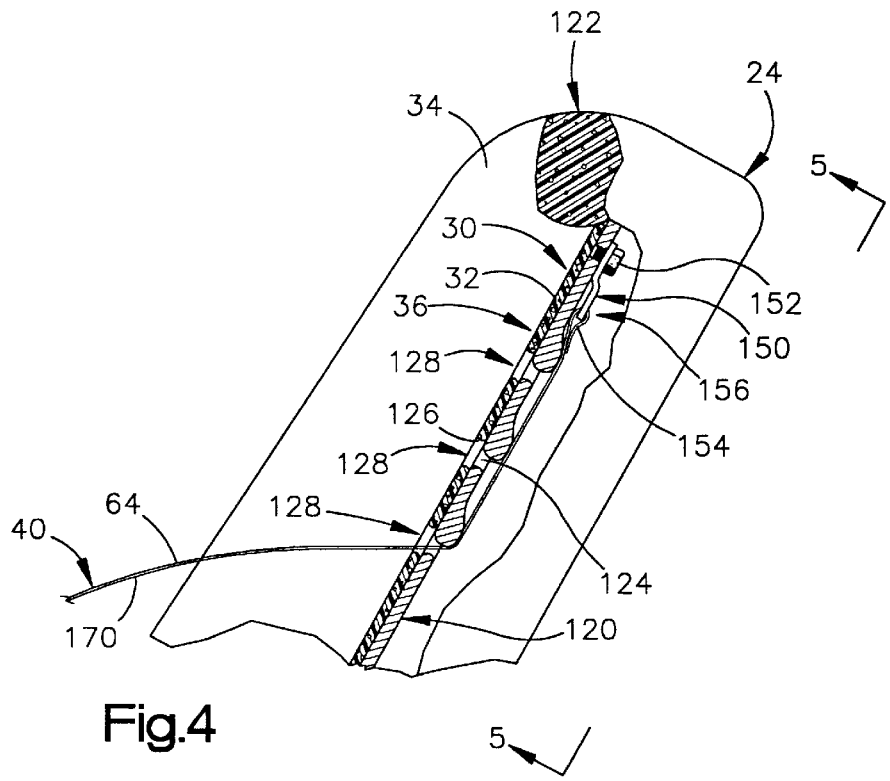
FIG. 4 is a side view, partly in section, of parts of the apparatus of FIG. 1.

As further shown in FIGS. 1 and 4, the back 24 of the vehicle seat 14 includes a seat frame 120 and a seat cover 122. The seat frame 120 has an inner edge surface 124. The seat cover 122 has an inner edge surface 126 which is adjacent to, and generally coextensive with, the inner edge surface 124 of the seat frame 120. The adjacent inner edge surfaces 124 and 126 of the seat frame 120 and the seat cover 122 together define a plurality of first webbing guide openings 128 at the back 36 of the child seat 10. The first webbing guide openings 128 are shaped as horizontally elongated slots, and are arranged in a vertically extending row. The inner edge surfaces 124 and 126 further define a first webbing adjustment opening 130 (FIG. 1). The first webbing adjustment opening 130 is shaped as a vertically elongated slot, and communicates the first webbing guide openings 128 with each other.

In a similar manner, but in an opposite orientation, a plurality of second webbing guide openings 132 (FIG. 1) also are defined at the back 36 of the child seat 10. The second webbing guide openings 132 are defined by another pair of adjacent, generally coextensive inner edge surfaces 134 and 136 of the seat frame 120 and the seat cushion 122, respectively, and also are defined as a vertically extending row of horizontally elongated slots. The inner edge surfaces 134 and 136 further define a second webbing adjustment opening 138 as a vertically extending slot which communicates the second webbing guide openings 132 with each other.

Figure 5:
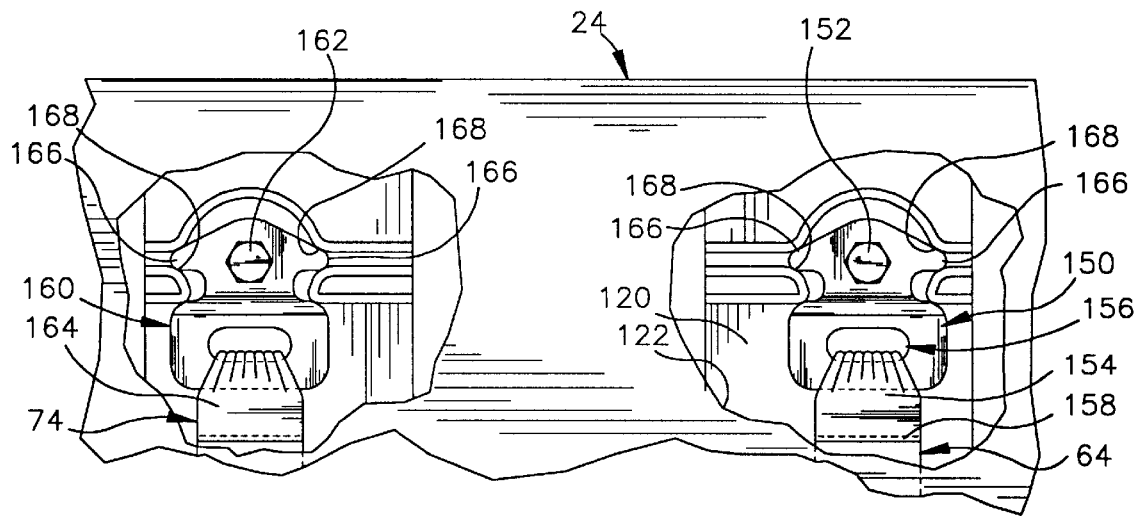
FIG. 5 is a view taken on line 5—5 of FIG. 4.

As shown in FIGS. 4 and 5, a first webbing anchor 150 is permanently attached to the seat frame 120 by a fastener 152 at a location directly above the row of first webbing guide openings 128 at the back 36 of the child seat 10. The shoulder belt section 64 of the first belt 40 extends through one of the first webbing guide openings 128, and further extends upward to the first webbing anchor 150. An upper end portion 154 of the shoulder belt section 64 extends through an opening 156 in the first webbing anchor 150 in a loop which is closed by stitches 158 (FIG. 5). In this manner, the upper end portion 154 of the shoulder belt section 64 is permanently attached to the seat back 24 at a first attachment location directly above the first webbing guide openings 128.

The shoulder belt section 74 of the second belt 42 similarly extends through one of the second webbing guide openings 132, as shown in FIG. 1. Moreover, as shown in FIG. 5, a second webbing anchor 160 and a fastener 162 permanently attach an upper end portion 164 of the shoulder belt section 74 to the seat back 24 in the same manner as described above with reference to the first webbing anchor 150, the fastener 152, and the shoulder belt section 62. In this manner, the upper end portion 164 of the shoulder belt section 74 is permanently attached to the seat back 24 at a location directly above the row of second webbing guide openings 132.

In accordance with a specific feature of the present invention, each of the webbing anchors 150 and 160 has a pair of horizontally extending arms 166, as shown in FIG. 5. The seat frame 120 has surfaces 168 which engage the arms 166 so as to block the webbing anchors 150 and 160 from moving pivotally about the fasteners 152 and 162 relative to the seat back 24.

The shoulder belt sections 64 and 74 of the first and second belts 40 and 42 can be adjusted by moving them through the first and second webbing adjustment openings 130 and 138, respectively. Specifically, the shoulder belt sections 64 and 74 have respective intermediate portions 170 and 172 which extend downward from the back 36 of the child seat 10 toward the child seat cushion 22, as shown in FIG. 1. Each of the intermediate portions 170 and 172 thus has a lower end at the location of the associated tongue 60 or 70, and has an upper end at the location of the webbing guide opening 128 or 132 from which the respective shoulder belt section 64 or 74 extends. When the shoulder belt section 64 of the first belt 40 is moved through the first webbing adjustment opening 130 from one of the first webbing guide openings 128 to another of the first webbing guide openings 128, the length of the intermediate portion 170 of the shoulder belt section 64 is changed accordingly. The length of the intermediate portion 172 of the other shoulder belt section 74 is likewise changed when the other shoulder belt section 74 is moved through the second webbing adjustment opening 138 from one of the second webbing guide openings 136 to another of the second webbing guide openings 136. Since the upper end portions 154 and 164 of the shoulder belt sections 64 and 74 are permanently attached to the seat back 24 as described above, all lengthwise adjustments of the shoulder belt sections 64 and 74 are made without detaching the shoulder belt sections 64 and 74 from the seat back 24.

When the first, second, and third belts 40, 42 and 104 are fastened about a seated child in the positions shown in FIG. 1, the rewind springs 94 and 96 in the retractor assembly 18 continuously urge the spools 80 and 82 to rotate in their winding directions. As a result, the retractor assembly 18 takes up slack in the lap belt sections 62 and 72 by retracting them inward of the child seat cushion 22. Slack is also taken up in the shoulder belt sections 64 and 74 as the retracting lap belt sections 62 and 72 pull the lower ends 65 and 75 of the shoulder belt sections 64 and 74 downward toward the child seat cushion 22.

Figure 6:
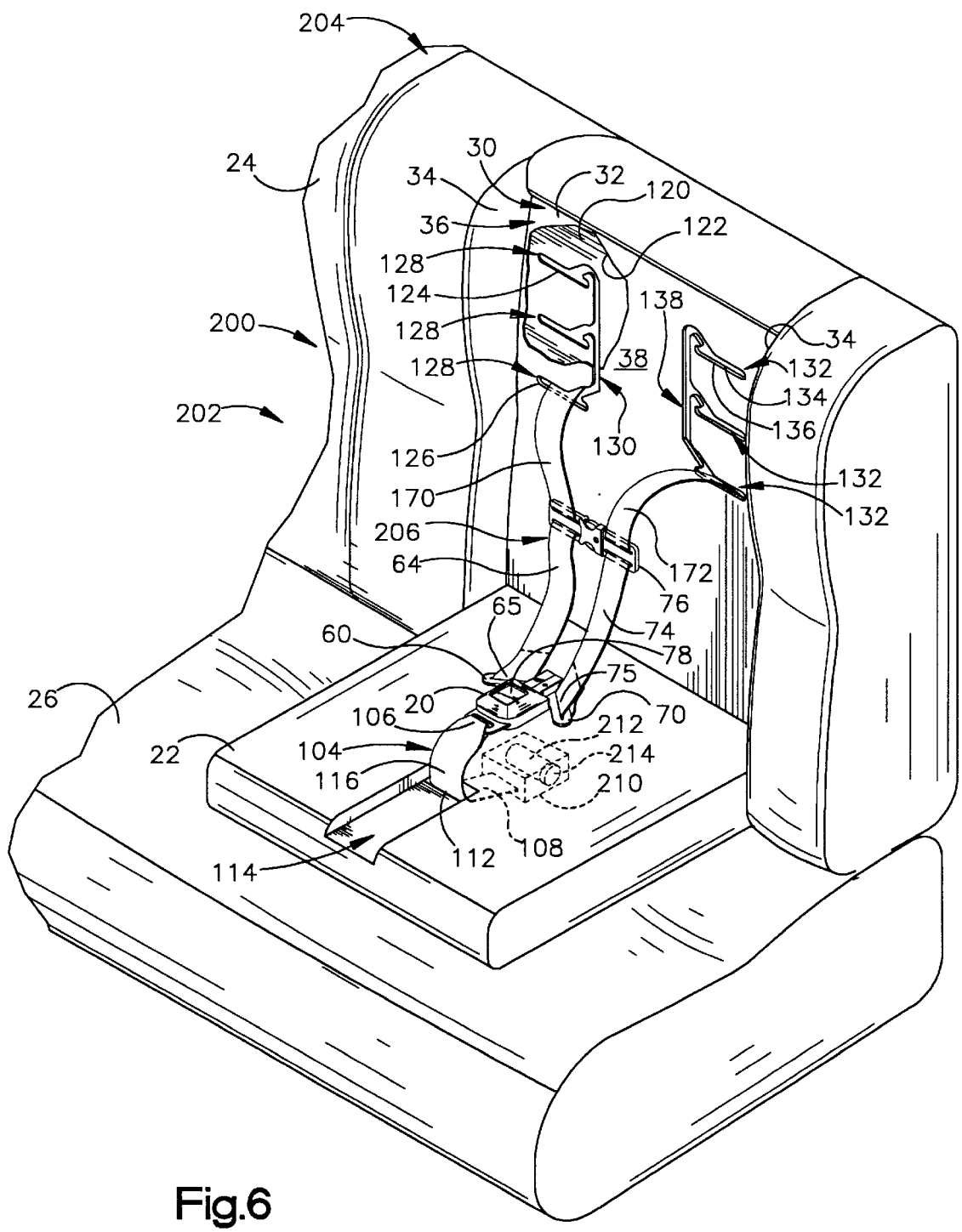
FIG. 6 is a view of a second preferred embodiment of the present invention.

As shown in FIG. 6, a second preferred embodiment of the present invention comprises a child seat 200 and a child seat belt system 202. The child seat 200 is a portion of a vehicle seat 204. The child seat belt system 202 includes seat belt webbing 206. As indicated by the use of the same reference numbers in FIGS. 6 and 1, the child seat 200, the child seat belt system 202 and the vehicle seat 204 in the second embodiment of the invention have many parts that are the same as corresponding parts of the child seat 10, the child seat belt system 12 and the vehicle seat 14 in the first embodiment of the invention. However, the seat belt webbing 206 in the second embodiment does not include lap belt sections. Instead, the shoulder belt sections 64 and 74 of the webbing 206 are fixed to the first and second tongues 60 and 70, and thus terminate at their respective lower ends 65 and 75.

Moreover, the second embodiment of the invention includes a retractor assembly 210 having a single spool 212 with a rewind spring 214. The inner end portion 108 of the third belt 104 is connected with the spool 212, and is continuously subjected to the retracting force of the rewind spring 214. Therefore, when the webbing 206 is fastened about a seated child in the arrangement shown in FIG. 6, the retractor assembly 210 takes up slack in the third belt 104 by retracting the third belt 104 inward of the child seat cushion 22. The retractor assembly 210 thus adjusts the length of the outer portion 116 of the third belt 104, and thereby adjusts the position of the buckle 20, so as to accommodate the size of the seated child. Slack is also taken up in the shoulder belt sections 64 and 74 as retraction of the third belt 104 pulls the buckle 20, the tongues 60 and 70, and the lower ends 65 and 75 of the shoulder belt sections 64 and 74 downward toward the child seat cushion 22.

From the above description of the invention, those skilled in the art will perceive improvements, changes and modifications. For example, the present invention is equally applicable to a portable child seat that is not constructed as part of a vehicle seat. Such improvements, changes and modifications within the skill of the art are intended to be covered by the appended claims.

Having described the invention, the following is claimed:

1. Apparatus comprising:

a child seat for a vehicle, said child seat including a seat back and a seat cushion, said seat cushion having a rear end adjoining said seat back, a forward end spaced from said seat back, and first and second opposite sides which are spaced from each other across said seat cushion, said first and second opposite sides of said seat cushion having first and second webbing outlets, respectively;

a first spool supported on said seat cushion for winding and unwinding rotation;

a second spool supported on said seat cushion for winding and unwinding rotation;

a first seat belt extending from said first spool to said first webbing outlet and further extending outward through said first webbing outlet, said first seat belt having a first lap belt section extending from said first webbing outlet and having a first shoulder belt section extending from said first lap belt section to said seat back;

a second seat belt extending from said second spool to said second webbing outlet and further extending outward through said second webbing outlet, said second seat belt having a second lap belt section extending from said second webbing outlet and having a second shoulder belt section extending from said second lap belt section to said seat back; and means for permanently attaching said first and second shoulder belt sections to said seat back.

2. Apparatus comprising:

a child seat for a vehicle, said child seat including a seat back and a seat cushion;

seat belt webbing having a plurality of sections including first and second shoulder belt sections, each of said shoulder belt sections having an upper end and a lower end;

anchor means for permanently attaching said upper ends of said shoulder belt sections immovably to said seat back;

retractor means for taking up slack in said seat belt webbing by pulling said lower ends of said shoulder belt sections downward toward said seat cushion; and mounting means for mounting said retractor means on said seat cushion.

3. Apparatus as defined in claim 2 wherein said seat belt webbing further includes first and second lap belt sections which are respectively contiguous with said first and second shoulder belt sections, said retractor means taking up slack by retracting said lap belt sections.

4. Apparatus as defined in claim 2 further comprising a seat belt buckle and first and second tongues which are releasably lockable in said seat belt buckle, each of said lower ends of said shoulder belt sections adjoining a respective one of said tongues, and a means for taking up slack including means for adjusting the position of said seat belt buckle relative to said seat cushion.

5. Apparatus as defined in claim 4 wherein said seat belt webbing further includes a crotch belt extending from said seat cushion to said seat belt buckle, said means for taking up slack including a retractor assembly having spring means for retracting said crotch belt.

6. Apparatus as defined in claim 2 wherein said seat back includes webbing guide means for defining a first webbing guide opening through which said first shoulder belt section is receivable, and for defining a second webbing guide opening through which said second shoulder belt section is receivable, said upper ends of said first and second shoulder belt sections being permanently attached to said seat back at first and second attachment locations, respectively, said first and second attachment locations being above said first and second webbing guide openings.

7. Apparatus as defined in claim 6 wherein said webbing guide means further defines first and second webbing adjustment openings, said first webbing guide opening being one of a plurality of first webbing guide openings which are defined by said webbing guide means and which communicate with each other through said first webbing adjustment opening, said second webbing guide opening being one of a plurality of second webbing guide openings which are defined by said webbing guide means and which communicate with each other through said second webbing adjustment opening.

* * * * *